United States Patent [19]

Izumo

[11] Patent Number: 5,868,448
[45] Date of Patent: Feb. 9, 1999

[54] GLOVE BOX STRUCTURE

[75] Inventor: Norifumi Izumo, Shizuoka-ken, Japan

[73] Assignee: Suzuki Motor Corporation, Shizuoka-ken, Japan

[21] Appl. No.: 760,560

[22] Filed: Dec. 5, 1996

[30] Foreign Application Priority Data

Feb. 28, 1996 [JP] Japan .................................... 8-040856

[51] Int. Cl.⁶ .................................................... B60R 7/06
[52] U.S. Cl. ..................... 296/37.1; 296/37.12; 224/483; 292/338; 220/335; 217/60 C
[58] Field of Search ................. 296/37.1, 37.8, 296/37.12; 224/483; 292/338; 220/335; 217/60 B, 60 C

[56] References Cited

U.S. PATENT DOCUMENTS

| 881,492 | 3/1908 | Schiller | 217/60 C |
| 4,460,105 | 7/1984 | Cox | 217/60 C X |
| 4,552,399 | 11/1985 | Atarashi | 296/37.12 |

FOREIGN PATENT DOCUMENTS

| 59036 | 5/1980 | Japan | 224/282 |

*Primary Examiner*—Dennis H. Pedder
*Attorney, Agent, or Firm*—Morrison Law Firm

[57] ABSTRACT

A glove box structure uses clip members fixed to a glove box slidably engaging arms that extend inwardly from a lid. Resilient cam surfaces in the clip members support beads on the arms for maintaining the lid in an open position. Resilient cam surfaces flex outward to allow slidable passage of the arms and the beads when the lid is moved between the open position and a closed position. The resilient cam surfaces return inward below the beads to support the lid in its open position until additional manual force is applied to close the lid.

6 Claims, 8 Drawing Sheets

GLOVE BOX STRUCTURE

BACKGROUND OF THE INVENTION

The present invention relates to a glove box structure that supports a lid in an open position. The glove box structure includes arms for guiding the lid between a closed position and the open position, and clip members which engage beads in the arms to hold the lid in the open position.

A conventional automobile includes an instrument panel facing the front seats. A speedometer, fuel meter and the like are mounted in the instrument panel. A glove box is typically mounted in the instrument panel opposite the front passenger seat. The glove box includes a lid which closes over the glove box to prevent items placed inside the glove box from falling out. One type of prior art lid is mounted on the glove box by a hinge which connects an upper edge of the lid to an upper wall of the glove box. By this arrangement the lid pivots upwardly about its hinged upper edge when the glove box is opened.

One shortcoming of the prior art design is that the lid must be held open manually while placing objects into or removing objects from the glove box. In response to the shortcoming, other prior art glove box structures include wire springs in the hinge mechanism to bias the lid upwardly when the lid is in the open position.

Although the wire springs initially hold the lid in the open position, one shortcoming of the spring biased prior art design is that springs lose elasticity after repetitive use. Therefore, over time, the springs fail to hold the lid in the fully open position. As a result, even with spring bias, the prior art lid must be held open manually while placing objects into or removing objects from the glove box. As can readily be appreciated, manually holding the lid open makes depositing or removing objects more difficult. Furthermore, using strong springs is costly and time consuming.

OBJECTS AND SUMMARY OF THE INVENTION

It is an object of the invention to provide a glove box structure which overcomes the drawbacks of the prior art.

It is another object of the present invention to provide a glove box structure which supports a lid at a fully open position.

It is a further object of the invention to provide a glove box structure which avoids loss of hold-open ability with continued use.

Briefly stated, the present invention provides a glove box structure that uses clip members fixed to a glove box slidably engaging arms that extend inwardly from a lid. Resilient cam surfaces in the clip members support beads on the arms for maintaining the lid in an open position. Resilient cam surfaces flex outward to allow slidable passage of the arms and the beads when the lid is moved between the open position and a closed position. The resilient cam surfaces return inward below the beads to support the lid in its open position until additional manual force is applied to close the lid.

According to an embodiment of the present invention, there is provided a door control structure comprising: a face having an opening therein, a door fittable to the opening, the door rotatably mounted above the opening so the door pivots about a center point located above the opening, means for permitting the door to rotate upward and downward between a closed position where the door covers the opening and an open position where the door exposes the opening, at least one arcuate arm extending inward rigidly from the door for guiding the door about the center point, the arcuate arm having a bead adjacent a free end thereof, the bead having a thickness greater than an adjacent portion of the arcuate arm, at least one clip member adjacent a side of the opening, the arcuate arm slidably engaging the clip member, at least one cam surface in the clip member adjacent passage of the arcuate arm, the bead urging the cam surface outwardly to permit upward passage of the bead, and the cam surface resiliently returning inwardly below the bead after upward passage of the bead to prevent downward passage of the bead under a normal closing force of the door.

According to a feature of the invention, there is provided a glove box structure comprising: a glove box, the glove box including a front wall having an opening therein, a lid fittable to the opening, the lid rotatably mounted on the glove box by first and second hinges, the first and second hinges having first portions being rotatably mounted to the glove box above the opening, the first and second hinges having second portions being connected to a back side of the lid, the lid rotatably mounted above the opening so the lid pivots about a center point located above the opening, the lid rotating upward and downward between a closed position where the lid covers the opening and an open position where the lid exposes the opening, first and second clip members being disposed on opposing sides of the opening, first and second arcuate arms extending inward rigidly from the lid, the first and second arcuate arms being parallel, the first arcuate arm slidably engaging the first clip member, the second arcuate arm slidably engaging the second clip member, the first arcuate arm having a first bead adjacent a free end thereof, the second arcuate arm having a second bead adjacent a free end thereof, the first and second beads having thicknesses greater than adjacent portions of the first and second arcuate arms, a first cam surface in the first clip member adjacent passage of the first arcuate arm, a second cam surface in the second clip member adjacent passage of the second arcuate arm, the first bead urging the first cam surface outwardly to permit upward passage of the first bead, the second bead urging the second cam surface outwardly to permit upward passage of the second bead, the first and second cam surfaces resiliently returning inwardly below the first and second beads after upward passage of the first and second beads to prevent downward passage of the first and second beads under a normal closing force of the lid, the first and second arcuate arms having stop members at the free ends thereof, the stop members for preventing the lid from rotating beyond the open position, a U-shaped bar fixed to the glove box within the opening so the U-shaped bar projects upwardly into the opening, a locking mechanism extending through the lid, and the locking mechanism engaging the U-shaped bar when the lid is in the closed position to hold the lid in the closed position.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
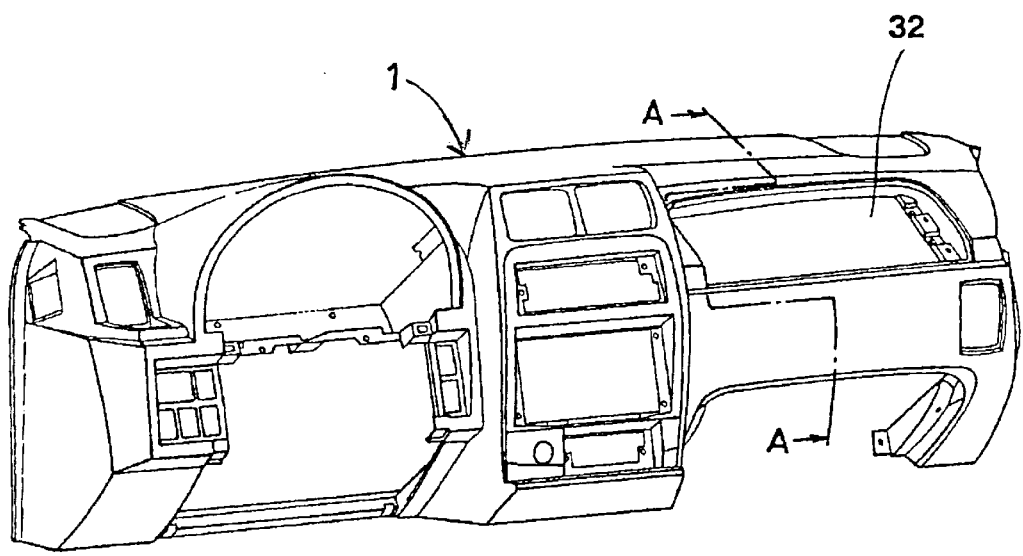
FIG. 1 is a perspective view showing an instrument panel of an automobile.

Referring to FIG. 1, a conventional front interior instrument panel 1 of an automobile includes a cavity 32 in which a glove box structure can be mounted.

Figure 2:
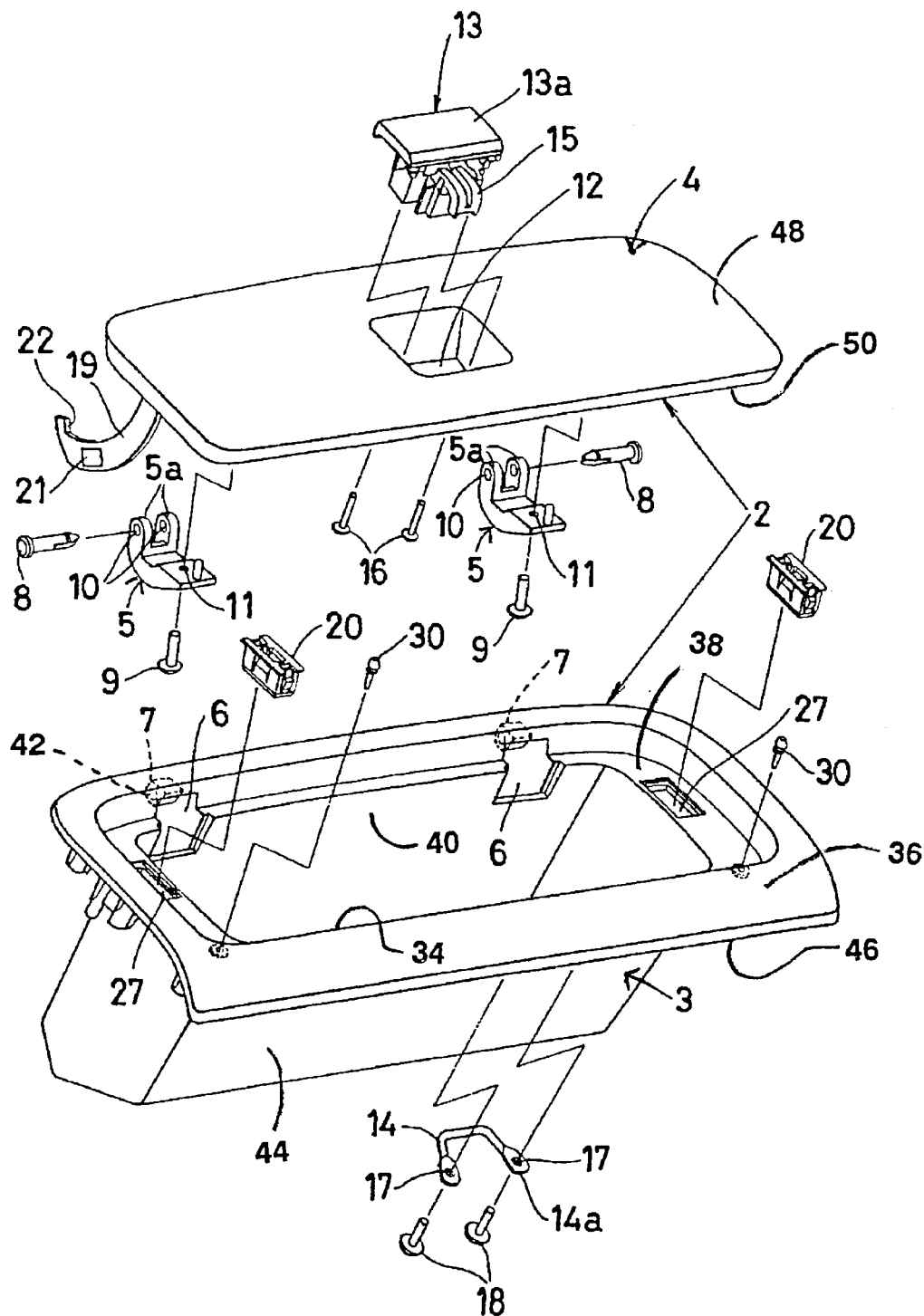
FIG. 2 is an exploded perspective view showing the glove box structure according to an embodiment of the present invention.

Referring now to FIG. 2, a glove box structure 2 of the present invention includes a glove box 3. A front opening 34 allows access to an interior portion of glove box 3 for the storing of items. Trim on an exterior face 36 and a recessed interior face 38 define front opening 34. Cushion members 30 are fixed to recessed interior face 38 on a portion of recessed interior face 38 hidden behind front opening 34 in FIG. 2. Clip apertures 27 extend through recessed interior face 38 to the right and left of front opening 34. Clip members 20 are fixed within clip apertures 27. An upper wall 40 of glove box 3 includes a pair of hinge apertures 6 adjacent right and left sides of front opening 34. Hinge apertures 6 extend downward from an exterior surface of upper wall 40 to an interior surface of upper wall 40. Cylindrical support members 7 are integrally formed on an exterior surface of upper wall 40 adjacent hinge apertures 6. A bore 42 extends through each cylindrical support member 7. A U-shaped locking bar 14 projects upward through a bottom wall 44 of glove box 3 into front opening 34. U-shaped locking bar 14 is centered laterally adjacent the outer edge of bottom wall 44. Each end 14a of U-shaped locking bar 14 is flattened. An aperture 17 extends through each flattened end 14a. Screws 18 screw through apertures 17 into a back surface 46 of exterior face 36 fixing U-shaped locking bar 14 to back surface 46.

Hinges 5 extend through hinge apertures 6. Support projections 5a spaced face to face are integrally formed at an upper end of each hinge 5. Support projections 5a include aligned pin apertures 10. Support projections 5a are rotatably mounted with cylindrical support members 7 using pins 8 which extend through aligned apertures 6 and bores 42. Lower ends of hinges 5 include attachment holes 11. A lid 4 is fixed to lower ends of hinges 5 through screws 9 which screw through attachment holes 11 into an upper portion of a back surface 50 of lid 4. The cooperation of hinges 5 with cylindrical support members 7 allow lid 4 to rotate between a closed position and an open position.

An aperture 12 extends through the center of lid 4. A locking mechanism 13 is fixed within aperture 12 by screws 16. A handle 13a of locking mechanism 13 rests flush with a front surface 48 of lid 4. A hook 15 of locking mechanism 13 projects beyond back surface 50 of lid 4. When lid 4 is in the closed position hook 15 engages U-shaped locking bar 14 to lock lid 4. To unlock lid 4 handle 13a is lifted thereby causing hook 15 to disengage U-shaped locking bar 14.

Cantilevered arcuate arms 19 are integrally formed on left and right portions of back surface 50 of lid 4. An intermediate portion of each cantilevered arcuate arm 19 is thickened to form an engagement bead 21. A stop member 22 is formed at a free end of each cantilevered arcuate arm 19. Cantilevered arcuate arms 19 slidably engage clip members 20 to facilitate rotation of lid 4 about the center point defined by cylindrical support members 7.

Figure 3:
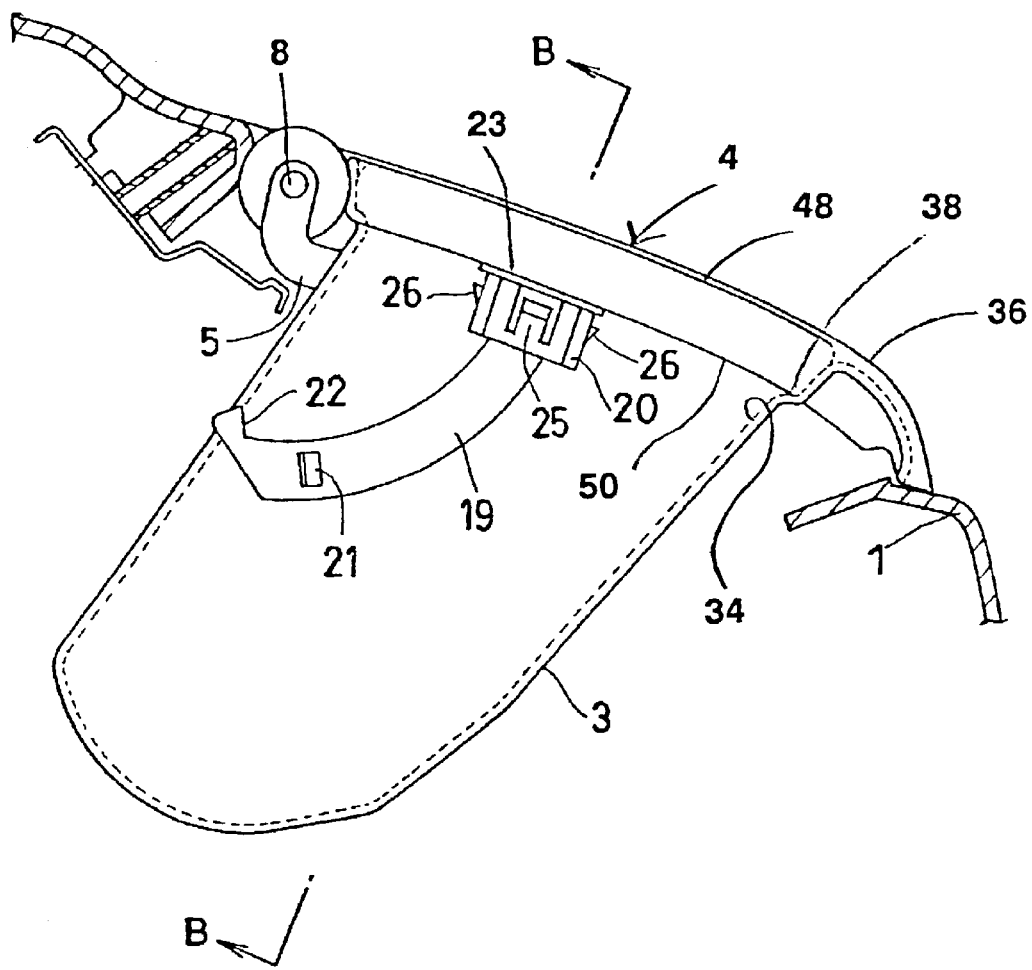
FIG. 3 is a cross-sectional view taken along line A—A in FIG. 1 when the glove box structure is inserted within the instrument panel showing the a lid of the glove box structure in the closed position.

Referring now to FIG. 3, in the closed position, lid 4 covers front opening 34 preventing access to the interior portion of glove box 3. Front surface 48 of lid 4 is flush with exterior face 36 of glove box 3. Outer edges of back surface 50 of lid 4 abut recessed interior face 38 of glove box 3. Flanges 23 of clip members 20 abut back surface 50. Engagement bead 21 and stop member 22 are spaced a distance from clip member 20.

Figure 4:
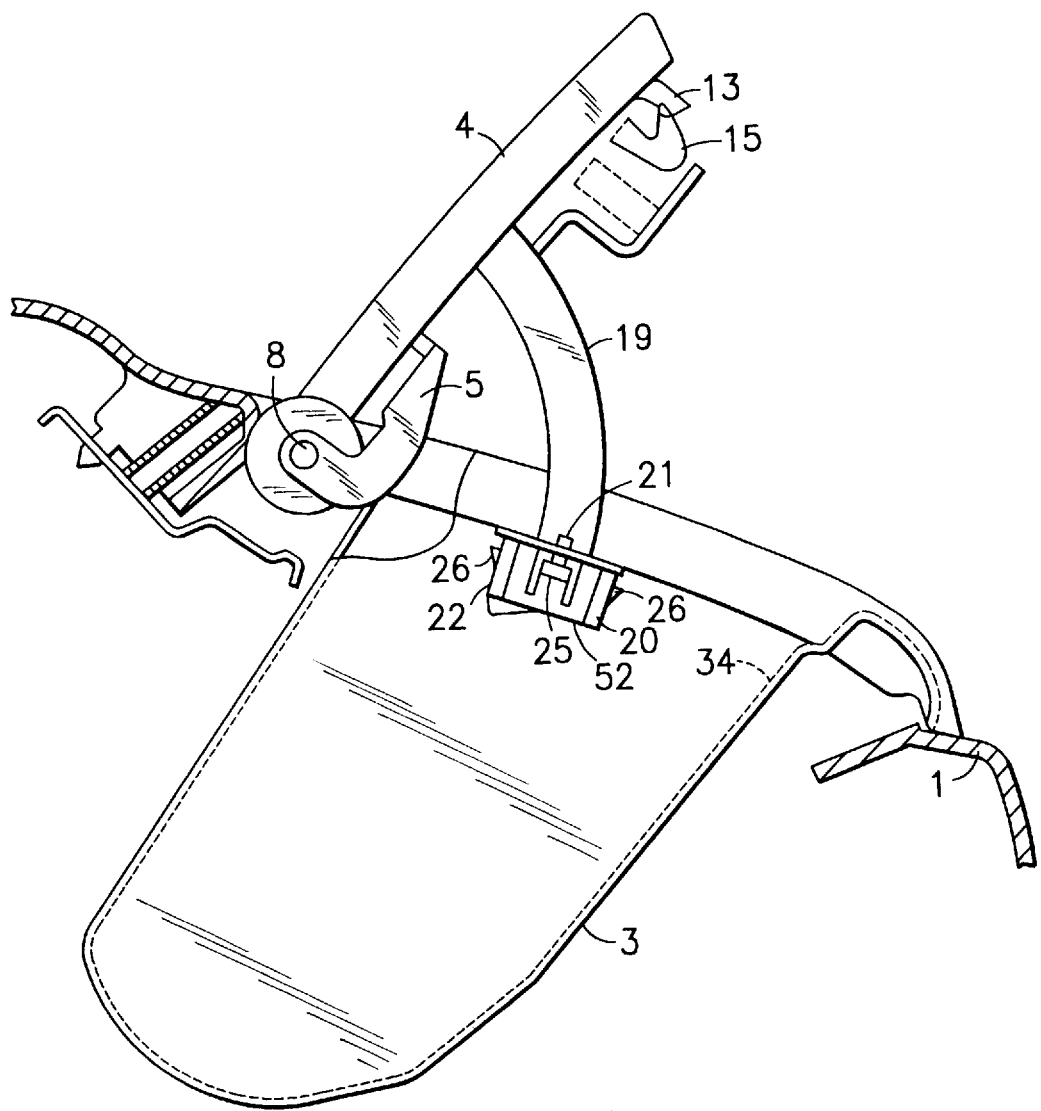
FIG. 4 is a cross-sectional view taken along line A—A in FIG. 1 when the glove box structure is inserted within the instrument panel showing the a lid of the glove box structure in the opened position.

Referring now to FIG. 4, in the open position lid 4 exposes front opening 34 permitting access to the interior portion of glove box 3. Stop member 22 abuts a base 52 of clip member 20 to prevent lid 4 from rotating upwards from front opening 34 beyond its limit. Engagement bead 21 cooperates with a resilient claw 25 of clip member 20 to prevent the weight of lid 4 from causing lid 4 to rotate downwards over front opening 34.

Figure 5:
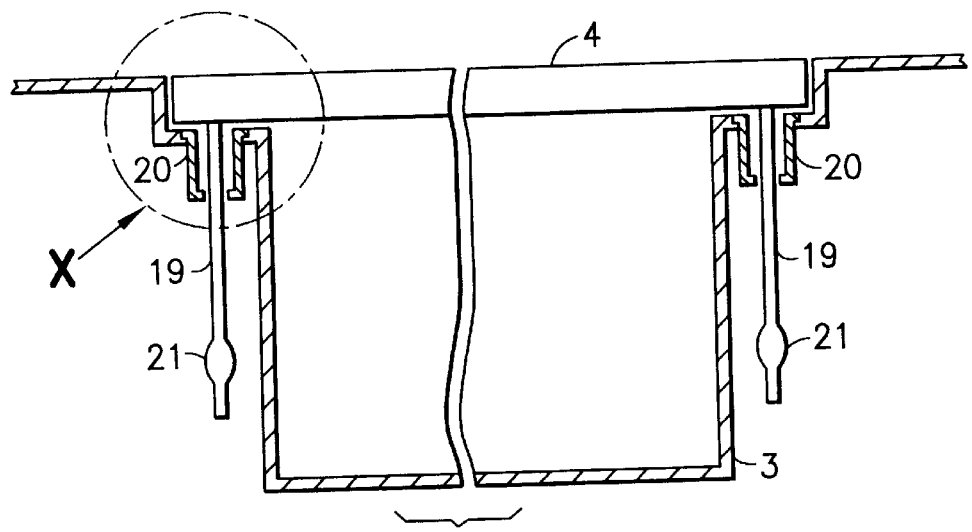
FIG. 5 is a cross-sectional view taken along line B—B in FIG. 3.
Figure 6:
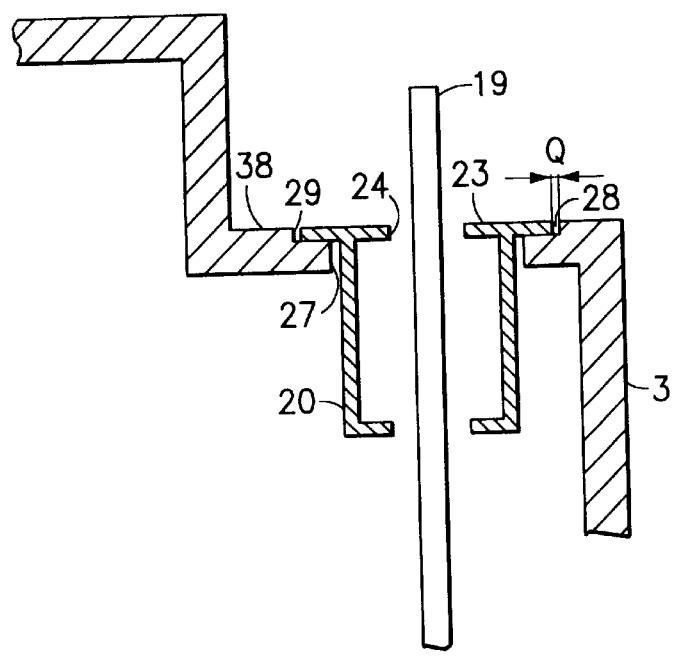
FIG. 6 is an enlarged cross-sectional view showing the details of section X in FIG. 5.

Referring now to FIGS. 5 and 6, a portion of recessed interior face 38 (FIG. 6) is further recessed to provide a shallow region 28 framing the circumference of clip aperture 27. Flanges 23 rest within shallow region 28 so the upper surfaces of flanges 23 are flush with recessed interior face 38. A clearance "Q" is formed between flanges 23 and an outer circumference 29 of shallow region 28. Clearance "Q" may be in the range of 0.5–1 mm.

Figure 7:
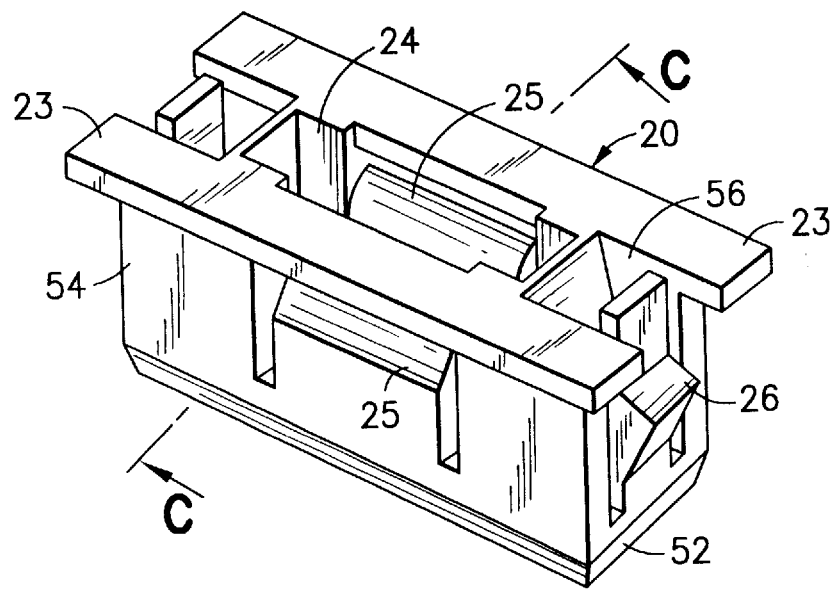
FIG. 7 is a perspective view showing a clip member of the glove box structure of the present invention.

Referring now to FIG. 7, base 52 of clip member 20 has a generally rectangular projection, but is bevelled or chamfered at its lower end to help guide it into clip aperture 27. H-shaped walls 54 are integrally formed adjacent the shorter opposing ends of base 52, extending perpendicularly above base 52. Flanges 23 are integrally formed on upper surfaces of H-shaped walls 54, extending parallel to base 52 projecting beyond the outer edges of base 52. Cam surfaces 25 are integrally formed intermediate the longer opposing ends of base 52 between H-shaped walls 54, extending perpendicularly above base 52 and terminating a short distance from flanges 23. A channel 24 is formed between flanges 23 and opposing U-shaped channels of H-shaped walls 54. Projections 26, integrally formed at the shorter opposing ends of base 52, extend perpendicularly above base 52 within outer U-shape channels of H-shaped walls 54.

Figure 8:
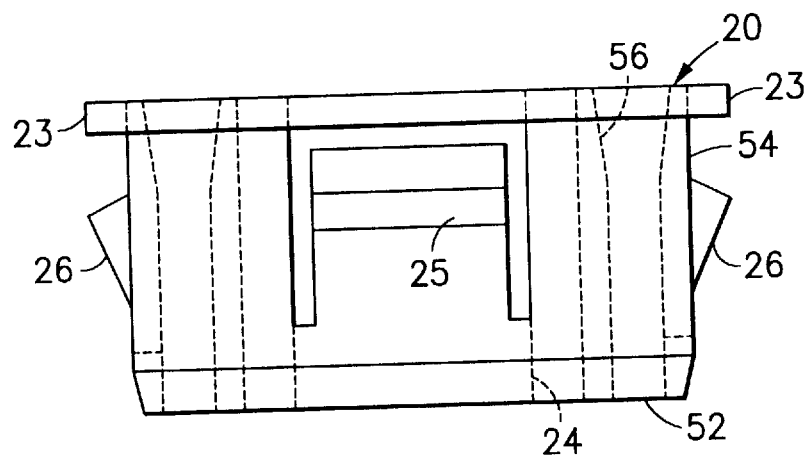
FIG. 8 is a front elevational view of the clip member of FIG. 7.

Referring now to FIG. 8, channel 24 extends through base 52. Cavities 56 extend downward through clip member 20 between projections 26 and outer U-shaped channels of H-shaped walls 54. Although not shown in the drawing, projections 26 are deflected into cavities 56 when clip member 20 is fixed within clip aperture 27 (not shown in FIG. 8).

Figure 9:
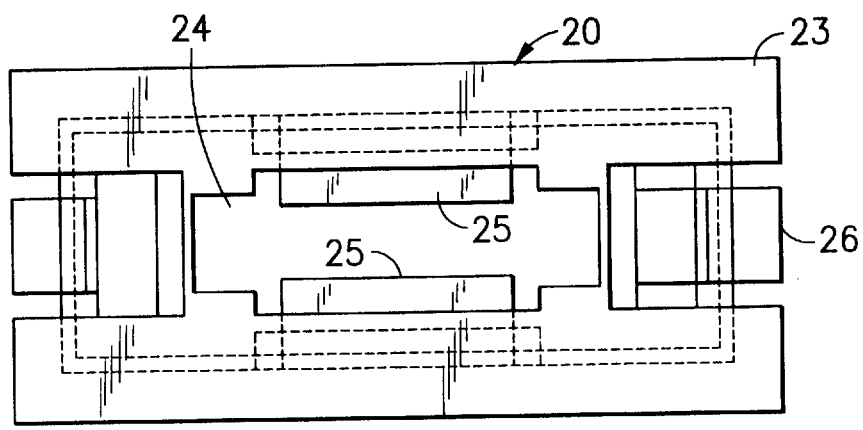
FIG. 9 is a top plan view of the clip member of FIG. 7.

Referring now to FIG. 9, cam surfaces 25 oppose one another in a face to face relationship. Cam surfaces 25 are spaced apart a distance less than the width of channel 24.

Figure 10:
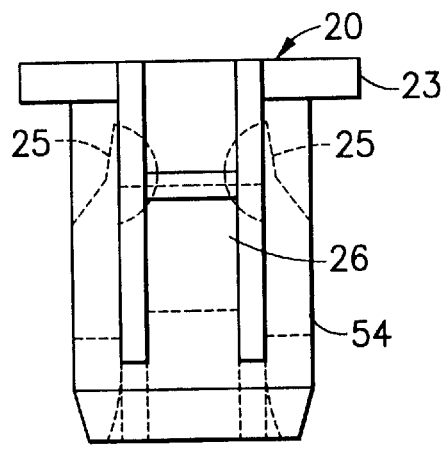
FIG. 10 is a side elevational view of the clip member of FIG. 7.

Referring now to FIG. 10, an upper portion of each cam surface 25 is formed in a semicircular shape with the curved portion of each cam surface 25 opposing its counterpart.

Figure 11:
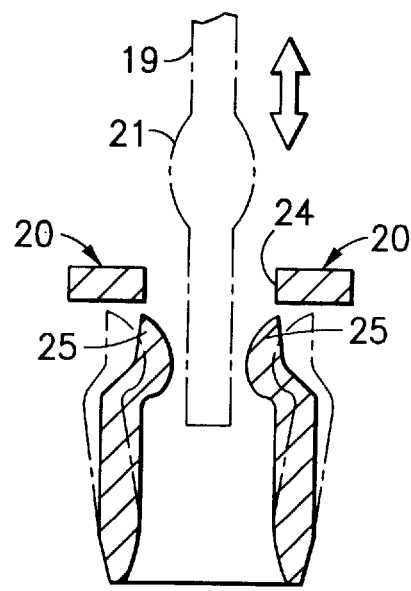
FIG. 11 is a cross-sectional view taken along line C—C in FIG. 7 showing how the claws of the clip member cooperate with an engagement bead of a cantilevered arcuate arm.

Referring now to FIG. 11, cantilevered arcuate arm 19 slidably engages clip member 20 through channel 24 to enable rotating movement of lid 4 (not shown in FIG. 11) between the open and closed positions. Cantilevered arcuate arm 19 moves up or down through engagement channel 24 as shown by the arrows. Cam surfaces 25 resiliently flex outward away from each other as engagement bead 21 passes between their curved portions. Cam surfaces 25 resiliently return to their original positions after engagement bead 21 passes beyond their curved portions.

Figure 12:
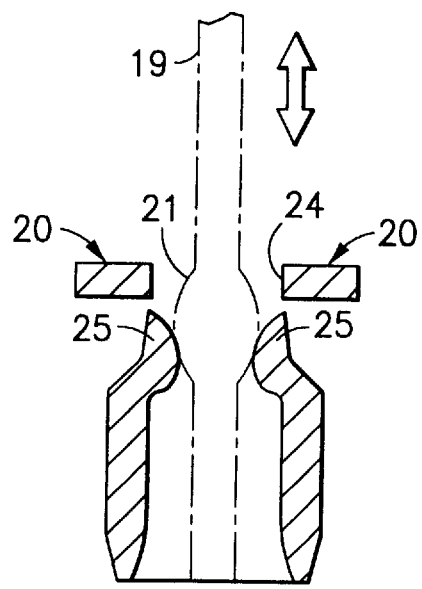
FIG. 12 is a cross-sectional view taken along line C—C in FIG. 7 showing how the engagement bead is supported by the claws.

Referring now to FIG. 12, engagement bead 12 rests on the curved portions of cam surfaces 25 when lid 4 (not shown in FIG. 12) is in the open position. Although cam surfaces 25 are flexible, cam surfaces 25 have sufficient rigidity to support the weight of lid 4 imposed by engagement bead 12. Thus cam surfaces 25 and engagement bead 12 cooperate to support lid 4 in the open position. To move lid 4 to the closed position, a slight downward pressure exerted on lid 4 forces engagement bead 21 to pass through cam surfaces 25 by resiliently flexing cam surfaces 25 outward.

Accordingly the present invention provides a glove box 3 which supports lid 4 in the open position through the cooperation of engagement beads 21 on cantilevered arcuate arms 19 attached to lid 4 with cam surfaces 25 in clip members 20 fixed in glove box 3.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

For example, clip members 20 may be fixed on cantilevered arcuate arms 19 and engagement beads 21 may be provided in glove box 3. Additionally, in lieu of cantilevered arcuate arms 19 a single arm or a plurality of arms of alternative shapes may be provided. Furthermore, in lieu of engagement bead 21 a plurality of engagement beads 21 may be provided for supporting lid 4 at multiple positions. Alternatively, in lieu of engagement bead 21 projections of alternative shapes may be provided.

What is claimed is:

1. A door control structure comprising:

a face having an opening therein;

a door fittable to said opening;

means for permitting said door to rotate upward and downward between a closed position where said door covers said opening and an open position where said door exposes said opening;

at least one arcuate arm extending inward rigidly from said door for guiding said door about said center point;

said at least one arcuate arm having a bead adjacent a free end thereof;

said bead having a thickness greater than an adjacent portion of said at least one arcuate arm;

at least one clip member adjacent a side of said opening;

said at least one arcuate arm slidably engaging said clip member;

at least one cam surface in said clip member adjacent passage of said at least on arcuate arm;

said bead urging said cam surface outwardly to permit upward passage of said bead; and said cam surface resiliently returning inwardly below said bead after upward passage of said bead to prevent downward passage of said bead under a weight of said door.

2. A structure according to claim 1, wherein:

said at least one arcuate arm includes first and second arcuate arms;

said first and second arcuate arms being parallel;

said at least one clip member includes first and second clip members;

said first and second clip members being disposed on opposing sides of said opening;

said first arcuate arm slidably engaging said first clip member; and said second arcuate arm slidably engaging said second clip member.

3. A structure according to claim 1, wherein:

said means for permitting said door to rotate includes at least one hinge;

a first portion of said at least one hinge being mounted above said opening; and a second portion of said at least one hinge being connected to a back side of said door.

4. A structure according to claim 1, wherein:

said free end of said at least one arcuate arm includes a stop member for preventing said door from rotating upward beyond said open position.

5. A structure according to claim 1, wherein:

said face includes a U-shaped bar fixed to said face within said opening so said U-shaped bar projects upwardly into said opening;

said door includes a locking mechanism for engaging said U-shaped bar; and said locking mechanism and said U-shaped bar engage to hold said door in said closed position.

6. A glove box structure comprising:

a glove box;

said glove box including a front wall having an opening therein;

a lid fittable to said opening;

said lid rotatably mounted on said glove box by first and second hinges;

said first and second hinges having first portions being mounted to said glove box above said opening;

said first and second hinges having second portions being connected to a back side of said lid;

said lid rotatably mounted above said opening so said lid pivots about a center point located above said opening;

said lid rotating upward and downward between a closed position where said lid covers said opening and an open position where said lid exposes said opening;

first and second clip members being disposed on opposing sides of said opening;

first and second arcuate arms extending inward rigidly from said lid;

said first and second arcuate arms being parallel;

said first arcuate arm slidably engaging said first clip member;

said second arcuate arm slidably engaging said second clip member;

said first arcuate arm having a first bead adjacent a free end thereof;

said second arcuate arm having a second bead adjacent a free end thereof;

said first and second beads having thicknesses greater than adjacent portions of said first and second arcuate arms;

a first cam surface in said first clip member adjacent passage of said first arcuate arm;

a second cam surface in said second clip member adjacent passage of said second arcuate arm;

said first bead urging said first cam surface outwardly to permit upward passage of said first bead;

said second bead urging said second cam surface outwardly to permit upward passage of said second bead;

said first and second cam surfaces resiliently returning inwardly below said first and second beads after upward passage of said first and second beads to prevent downward passage of said first and second beads under a weight of said lid;

said first and second arcuate arms having stop members at said free ends thereof;

said stop members for preventing said lid from rotating beyond said open position;

a U-shaped bar fixed to said glove box within said opening so said U-shaped bar projects upwardly into said opening;

a locking mechanism extending through said lid; and said locking mechanism engaging said U-shaped bar when said lid is in said closed position to hold said lid in said closed position.

* * * * *